Aug. 23, 1927.
A. NOSAN
1,640,051
ALTITUDE GAUGE FOR USE ON AIRCRAFT, ETC
Filed Aug. 18, 1926
2 Sheets-Sheet 1
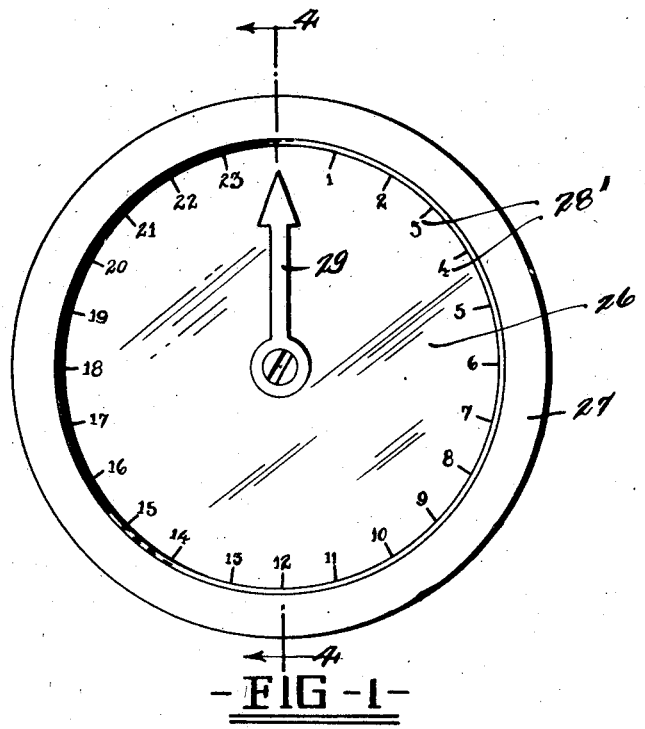
FIG-1-
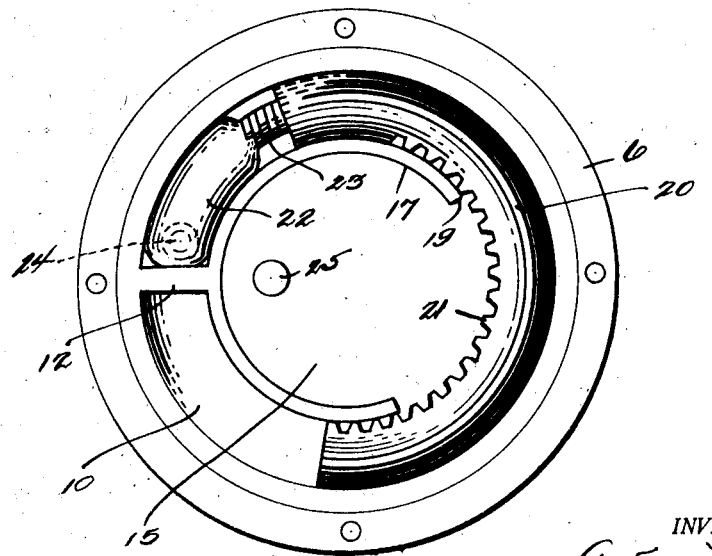
FIG-2-
INVENTOR.
Anton Nosan
BY John A. Bommhardt
ATTORNEY.

Aug. 23, 1927.
A. NOSAN
1,640,051
ALTITUDE GAUGE FOR USE ON AIRCRAFT, ETC
Filed Aug. 18, 1926    2 Sheets-Sheet 2
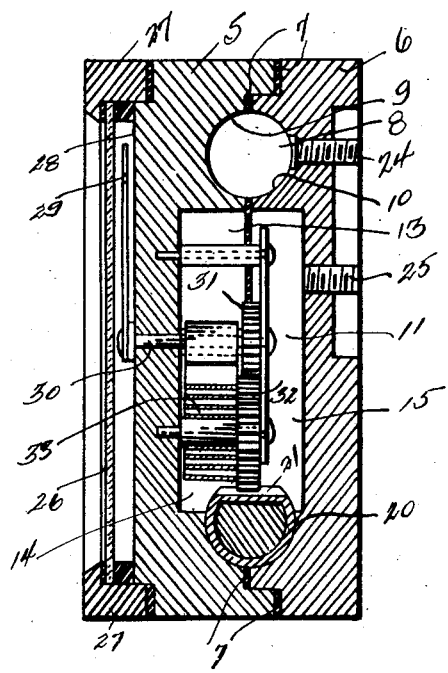
-FIG-4-
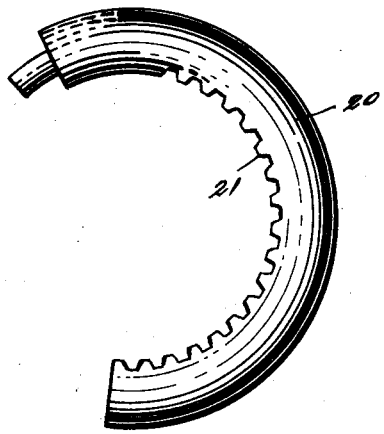
-FIG-3-
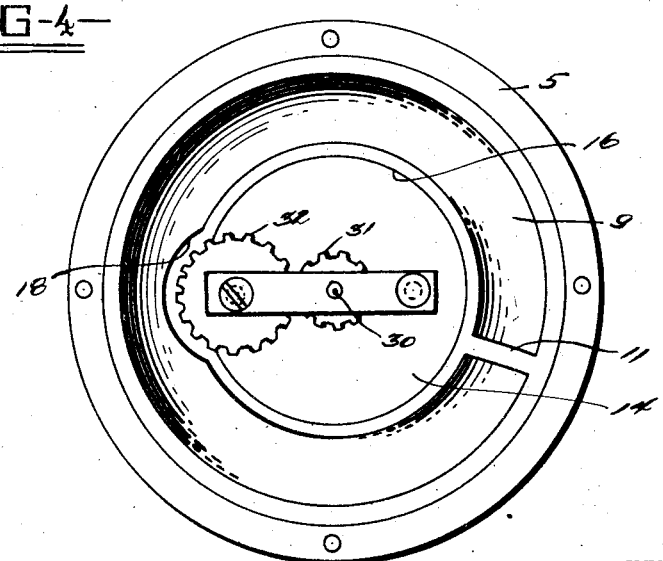
-FIG-5-
INVENTOR.
Anton Nosan
BY
John A. Bomnhardt
ATTORNEY.

Patented Aug. 23, 1927.

1,640,051

UNITED STATES PATENT OFFICE.

ANTON NOSAN, OF CLEVELAND, OHIO.

ALTITUDE GAUGE FOR USE ON AIRCRAFT, ETC.

Application filed August 18, 1926. Serial No. 129,983.

This invention relates to altitude gauges, and particularly to a gauge adapted for use on aircraft, altho it may be used under any conditions as a vacuum or air pressure indicator.

The object of the invention is to provide an improved indicator of this kind, in which the air pressure is proportioned to a vacuum by means of a rubber or other elastic bag which when more or less inflated in a vacuum chamber by the air pressure in the bag will indicate the pressure by means of a dial and pointer the latter of which is actuated by the bag.

Various advantages will be apparent in the structure from the following description and the accompanying drawings, in which Fig. 1 is a face view of the gauge. Fig. 2 is an interior view of the rear casing. Fig. 3 is a detail of the rack. Fig. 4 is a section on the line 4—4 of Fig. 1. Fig. 5 is an inside view of the front of the casing.

The gauge comprises front and rear casings 5 and 6 bolted together with gaskets 7 between them to make the joint airtight. An annular chamber 8 of circular cross-section is formed by matching annular semi-circular grooves 9 and 10 on the inner faces of the casing sections, and these grooves have transverse walls or partitions 11 and 12. A central chamber 13 is formed by central recesses 14 and 15 in the respective sections, and these recesses have annular interior walls 16 and 17 between the central chamber and the annular chamber 8. These walls 16 and 17 are cut away respectively as indicated at 18 and 19.

A segmental rack section 20, of segmental cross-section, fits in and may slide around in the chamber 8, and the inner wall of this segment is flattened and provided with rack teeth 21. An air bag 22 of rubber or other elastic material is fixed to one end of the rack as indicated at 23 and the other end has a nipple 24 threaded thru the rear casing 6 and open to the atmosphere. A check valve 25 is tapped into the casing 6 and may be used for exhausting the air from the chambers 8 and 13, thereby maintaining a vacuum therein. The front of the casing 5 has a dial glass 26 and a retaining ring or bezel 27 gasketed and secured by screws. The dial face 28 of the casing has graduated numerals 28' for indicating altitude. An indicating pointer 29 is carried on a shaft 30 which extends thru the front casing and has at the rear end a pinion 31 meshing with a gear 32 which meshes with the internal rack 21. A spiral spring 33 is wound around the arm of gear 32 and has one end secured thereto and the other looped around the boss on the pinion 31. The spring 23 tends to turn the pointer 29 toward zero and the rack 21 toward the bag inlet 24.

In use, the air under atmospheric pressure inflates the bag 22 according to the amount of said pressure in the vacuum chamber 8, thereby forcing the rack 21 around by the elongation of the bag 22, and this movement turns the hand 29 against the spring 33 to a numeral on the dial corresponding to the atmospheric pressure and consequently to the altitude above sea level. To measure any other gas pressure, the gas may be admitted thru the nipple 24 to inflate the bag with corresponding results.

By the means described, a reasonably accurate and sensitive altitude gauge is provided which will be found particularly useful for use on aeroplanes or the like.

I claim:

1. A gauge comprising a casing having a circular vacuum chamber therein, a segmental rack slidable in said chamber, an inflatable bag confined in said chamber and open to air pressure at the inside and pressing against one end of the rack, and means to indicate the movement of the rack.

2. The gauge as set forth in claim 3, said means including gearing mounted in the central part of the casing.

3. A gauge comprising a casing having an elongated vacuum chamber therein, a rack fitting and slidable in said chamber, an inflatable member confined in one end of the chamber and bearing against the rack, and an indicator operatively connected to the rack.

4. A gauge comprising a vacuum casing having an annular chamber therein and a central recess surrounded by said chamber, a slide in said chamber, an inflatable member in one end of said chamber to move the slide one way, means to indicate the extent of movement of the slide including transmission mechanism located in said central recess and operatively connected to the slide.

In testimony whereof, I do affix my signature.

ANTON NOSAN.